United States Patent
Doi et al.

(10) Patent No.: US 7,803,852 B2
(45) Date of Patent: *Sep. 28, 2010

(54) WATER-BASED INKS FOR INK-JET PRINTING

(75) Inventors: Yasuhiro Doi, Wakayama (JP); Yasushi Ito, Wakayama (JP)

(73) Assignee: Kao Corporation, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 11/817,829

(22) PCT Filed: Mar. 2, 2006

(86) PCT No.: PCT/JP2006/304536

§ 371 (c)(1),
(2), (4) Date: Sep. 5, 2007

(87) PCT Pub. No.: WO2006/095793

PCT Pub. Date: Sep. 14, 2006

(65) Prior Publication Data

US 2009/0005473 A1     Jan. 1, 2009

(30) Foreign Application Priority Data

Mar. 8, 2005   (JP) ............................. 2005-064042

(51) Int. Cl.
C09D 11/10   (2006.01)
C09D 109/06   (2006.01)
C08F 212/08   (2006.01)

(52) U.S. Cl. ...................... 523/161; 523/160; 524/577; 526/286

(58) Field of Classification Search ................. 523/161, 523/160; 524/577; 526/286
See application file for complete search history.

(56) References Cited

U.S. PATENT DOCUMENTS

| | | | | |
|---|---|---|---|---|
| 4,327,011 A | * | 4/1982 | Ripley et al. | 524/474 |
| 5,965,634 A | * | 10/1999 | Idogawa et al. | 523/161 |
| 6,417,248 B1 | * | 7/2002 | Gore | 523/160 |
| 7,265,165 B2 | * | 9/2007 | Ohkubo et al. | 523/205 |
| 2004/0116553 A1 | * | 6/2004 | Nakamura et al. | 523/160 |
| 2004/0157958 A1 | | 8/2004 | Vincent et al. | |
| 2005/0036021 A1 | * | 2/2005 | Ito et al. | 347/100 |
| 2008/0097015 A1 | * | 4/2008 | Doi et al. | 524/115 |
| 2009/0068359 A1 | * | 3/2009 | Doi et al. | 427/256 |

FOREIGN PATENT DOCUMENTS

| | | |
|---|---|---|
| EP | 1 153 991 | 11/2001 |
| EP | 1153991 A1 * | 11/2001 |
| EP | 1470928 A1 * | 10/2004 |
| JP | 2003144898 A * | 5/2003 |
| WO | 2006 038726 | 4/2006 |

OTHER PUBLICATIONS

JP 2003144898 A, May 2003, Satomic et al., Derwent Ab.*
U.S. Appl. No. 11/817,904, filed Sep. 6, 2007, Doi, et al.
U.S. Appl. No. 11/816,953, filed Aug. 23, 2007, Doi, et al.
U.S. Appl. No. 11/575,193, filed Mar. 13, 2007, Doi, et al.
U.S. Appl. No. 12/714,059, filed Feb. 26, 2010, Doi, et al.

* cited by examiner

*Primary Examiner*—Satya B Sastri
(74) *Attorney, Agent, or Firm*—Oblon, Spivak, McClelland, Maier & Neustadt, L.L.P.

(57) ABSTRACT

The present invention relates to a water-based ink for ink-jet printing which not only satisfies a high optical density but also exhibits an excellent high lighter-fastness; and a water dispersion used for the water-based ink. There are provided a water dispersion for ink-jet printing containing (A) a pigment and (B) water-insoluble polymer particles produced by polymerizing an ethylenically unsaturated monomer containing 25 to 85% by weight of an aromatic group-containing monomer in the presence of a reactive surfactant; and a water-based ink containing the water dispersion.

16 Claims, No Drawings

WATER-BASED INKS FOR INK-JET PRINTING

FIELD OF THE INVENTION

The present invention relates to water-based inks for ink-jet printing, and water dispersions used for the water-based inks.

BACKGROUND OF THE INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full coloration, low costs, capability of using ordinary paper as the recording medium, non-contact with printed images and characters, etc. Among such printing methods, in view of enhancing the weather resistance and water resistance of printed images and characters, an ink-jet printing method utilizing an ink containing a pigment as the colorant has now come to dominate (for example, refer to JP 10-338826A, JP 2000-336292A and JP 2001-329199A).

JP 10-338826A discloses an ink containing a solubilized resin emulsion that is produced by polymerizing a mixture containing water, a surfactant and an olefinic monomer such as acids thereof, a vehicle and a colorant in order to improve image-staining characteristics of the ink.

JP 2000-336292A discloses a pigment-dispersed ink-jet printing ink containing an acrylic emulsion produced from a monomer mixture containing 10 to 70% by weight of acrylic monomer having a polyoxyalkylene constitutional unit, and a pigment for the purpose of improving an ejection stability, an image sharpness, etc.

Also, JP 2001-329199A discloses an ink composition containing polymer particles containing a polyalkoxyalkylene derivative, etc., and a self-dispersible pigment to improve a high lighter-fastness and a rubbing resistance thereof.

SUMMARY OF THE INVENTION

The present invention relates to:

(1) A water dispersion for ink-jet printing containing (A) a pigment and (B) water-insoluble polymer particles produced by polymerizing an ethylenically unsaturated monomer containing 25 to 85% by weight of an aromatic group-containing monomer in the presence of a reactive surfactant; and (2) a water-based ink for ink-jet printing containing the water dispersion as defined in the above (1).

DETAILED DESCRIPTION OF THE INVENTION

Although the above prior patent documents describe inks having excellent ejection stability and storage stability, there is still a demand for enhancing the properties of these inks to a higher level.

The present invention relates to a water-based ink for ink-jet printing which not only satisfies a high optical density but also exhibits an excellent high lighter-fastness (resistance to staining of printed characters or images when traced with an aqueous fluorescent marker); and a water dispersion used for the water-based ink.

The present inventors have found that a water dispersion containing a pigment and specific water-insoluble polymer particles provides water-based inks for ink-jet printing which have a sufficient optical density as well as an excellent high lighter-fastness.

The water dispersion for ink-jet printing according to the present invention is characterized by containing (A) a pigment and (B) water-insoluble polymer particles produced by polymerizing an ethylenically unsaturated monomer containing 25 to 85% by weight of an aromatic group-containing monomer in the presence of a reactive surfactant (hereinafter referred to merely as the "water-insoluble polymer (B)" or the "water-insoluble polymer particles (B)"). The respective components of the water dispersion are explained below.

(A) Pigment

The pigment used in the present invention is not particularly limited, and may be either an untreated pigment, or a pigment stabilized in dispersibility using a polymeric dispersant, etc. In view of a good optical density and a good high lighter-fastness, a self-dispersible pigment is suitably used.

The untreated pigment may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

The organic pigment is preferably used for color water-based inks. Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

More specifically, as the organic pigment, there is preferably used at least one pigment selected from the group consisting of those pigments which are commercially available under various product numbers of C.I. Pigment Yellow, C.I. Pigment Red, C.I. Pigment Violet, C.I. Pigment Blue and C.I. Pigment Green.

Examples of the extender pigment include silica, calcium carbonate and talc.

The "self-dispersible pigment" means a pigment onto a surface of which at least one anionic or cationic hydrophilic group is bonded either directly or through the other atom group to thereby allow the pigment to be dispersed in an aqueous medium without using a surfactant or a resin. Examples of the other atom group include an alkylene group having 1 to 24 carbon atoms and preferably 1 to 12 carbon atoms, a substituted or unsubstituted phenylene group and a substituted or unsubstituted naphthylene group.

As the anionic hydrophilic group, any optional groups may be used as long as they exhibit a high hydrophilic property sufficient to allow the pigment particles to be stably dispersed in the aqueous medium. Specific examples of the anionic hydrophilic group include a carboxyl group ($-COOM^1$), a sulfonic group ($-SO_3M^1$), a phosphoric group ($-PO_3M^1{}_2$), $-SO_2NH_2$, $-SO_2NHCOR^1$, and dissociated ions thereof such as $-COO^-$, $-SO_3^-$, $-PO_3^{2-}$ and $-PO_3^-M^1$.

In the above chemical formulas, $M^1$ may be the same or different. Examples of $M^1$ include a hydrogen atom; alkali metals such as lithium, sodium and potassium; an ammonium group; and organic ammonium groups such as monomethyl ammonium, dimethyl ammonium, trimethyl ammonium, monoethyl ammonium, diethyl ammonium, triethyl ammonium, monomethanol ammonium, dimethanol ammonium and trimethanol ammonium.

$R^1$ is an alkyl group having 1 to 12 carbon atoms, a substituted or unsubstituted phenyl group or a substituted or unsubstituted naphthyl group.

Among these anionic hydrophilic groups, preferred are a carboxyl group ($-COOM^1$) and a sulfonic group ($-SO_3M^1$).

Examples of the cationic hydrophilic group include an ammonium group and an amino group. Among these cationic hydrophilic groups, preferred are quaternary ammonium groups. In particular, the cationic hydrophilic group is more preferably at least one group selected from the group consisting of those groups represented by the general formula (1):

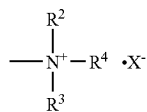

(1)

wherein $R^2$, $R^3$ and $R^4$ are each independently a hydrogen atom or $R^1$ as defined above; X is an anionic group obtained by removing a proton from a halogen atom such as fluorine and chlorine, a carboxylic acid such as acetic acid, propionic acid, lactic acid, glycolic acid, gluconic acid and glyceric acid, or an alkyl sulfate having 1 to 8 carbon atoms, and those group represented by the

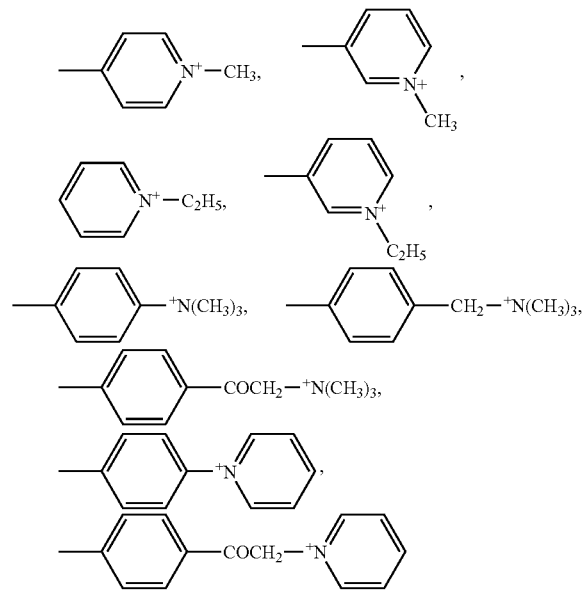

following formulae:

As the pigment used in the self-dispersible pigment, there may be used the above-mentioned inorganic pigments, organic pigments and extender pigments. Among these pigments, carbon blacks are preferably used for black water-based inks.

In order to render the pigment self-dispersible, a necessary amount of the above anionic or cationic hydrophilic group may be chemically bonded to a surface of the pigment. The hydrophilic group may be bonded to the surface of the pigment by any optional known method, for example, by the methods described in U.S. Pat. Nos. 5,571,311, 5,630,868 and 5,707,432; J. E. Johnson, "Imaging Science and Technology's 50th Annual Conference (1997)"; Yuan Yu, "Imaging Science and Technology's 53rd Annual Conference (2000)"; and "Polyfile", 1248 (1996).

More specifically, there may be used the method of introducing a carboxyl group into the pigment using compounds, e.g., acids having an oxidizing property such as nitric acid, hydrogen peroxide, hypochlorous acid and chromic acid; the method of introducing a sulfone group into the pigment by thermal decomposition of persulfate compounds; and the method of introducing the above anionic hydrophilic group into the pigment using diazonium compounds containing a carboxyl group, a sulfone group or an amino group, though not limited thereto.

The content of the anionic or cationic hydrophilic group is not particularly limited, and is preferably from 50 to 5,000 μmol/g and more preferably from 100 to 3,000 μmol/g per one gram of the self-dispersible pigment.

The average particle size of the self-dispersible pigment in the water dispersion or the water-based ink is preferably from 50 to 300 nm and more preferably from 60 to 200 nm in view of a good dispersion stability of the resultant dispersion. Meanwhile, the average particle size of the self-dispersible pigment may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times by inputting a refractive index of water (1.333) to the analyzing system as a refractive index of the dispersing medium.

Examples of the commercially available anionic self-dispersible pigment (carbon black) include "CAB-O-JET 200" and "CAB-O-JET 300" both available from Cabot Corp., "BONJET CW-1" and "BONJET CW-2" both available from Orient Chemical Industries Co., Ltd., and "Aqua-Black 162" (carboxyl group content: about 800 μmol/g) available from Tokai Carbon Co., Ltd.

These pigments may be used alone or in combination of any two or more thereof at an optional mixing ratio.

(B) Water-Insoluble Polymer Particles

The water-insoluble polymer particles (B) used in the present invention are particles of a water-insoluble polymer which is produced by polymerizing an ethylenically unsaturated monomer containing 25 to 85% by weight of an aromatic group-containing monomer in the presence of a reactive surfactant. The reason why the use of the water-insoluble polymer particles (B) enables enhancement of a high lighter-fastness of the resultant ink, is considered as follows. That is, since the water-insoluble polymer particles (B) exhibit a high affinity to the pigment and contain substantially no surfactant, prints obtained using the ink containing such water-insoluble polymer particles can show an excellent rubbing resistance even when contacted with a water-containing system such as inks for markers.

The "water-insoluble polymer" used herein means a polymer exhibiting a solubility in water of 10 g or lower, preferably 5 g or lower and more preferably 1 g or lower when the polymer is dried at 105° C. for 2 h and then dissolved in 100 g of water at 25° C. The solubility means a solubility in water of the water-insoluble polymer whose salt-forming groups are neutralized completely (100%) with sodium hydroxide or acetic acid according to kinds of the salt-forming groups to be neutralized.

Examples of the water-insoluble polymer include water-insoluble vinyl polymers, water-insoluble ester-based polymers and water-insoluble urethane-based polymers. Among these water-insoluble polymers, preferred are water-insoluble vinyl polymers.

The water-insoluble vinyl polymer is preferably produced by copolymerizing a monomer mixture containing (a) an aromatic group-containing monomer (hereinafter occasionally referred to merely as a "component (a)"), and (b) a salt-forming group-containing monomer (hereinafter occasionally referred to merely as a "component (b)") and/or (c) alkyl (meth)acrylate (hereinafter occasionally referred to merely as a "component (c)") (the mixture is hereinafter occasionally referred to merely as a "monomer mixture").

The aromatic group-containing monomer (a) is used for enhancing a high lighter-fastness of the resultant ink.

Examples of the preferred aromatic group-containing monomer include vinyl monomers containing an aromatic hydrocarbon group having 6 to 22 carbon atoms and preferably 6 to 12 carbon atoms which may contain a substituent group having a hetero atom. Specific examples of the preferred aromatic group-containing monomer include a styrene-based monomer (component (a-1)), and an aromatic group-containing (meth)acrylate (component (a-2)). Specific examples of the substituent group having a heteroatom include a halogen atom, an ester group, an ether group and a hydroxyl group.

Among these components (a), preferred is the styrene-based monomer (a-1). Specific examples of the styrene-based monomer (a-1) include styrene, 2-methyl styrene, vinyl toluene, ethylvinyl benzene, vinyl naphthalene and chlorostyrene. Among these styrene-based monomers, preferred are styrene and 2-methyl styrene. The content of the component (a-1) in the component (a) is preferably from 10 to 100% by weight and more preferably from 20 to 80% by weight in view of enhancing the optical density and the high lighter-fastness.

Also, examples of the preferred aromatic group-containing (meth)acrylate as the component (a-2) include (meth)acrylates containing an arylalkyl group having 7 to 22 carbon atoms, preferably 7 to 18 carbon atoms and more preferably 7 to 12 carbon atoms which may have a substituent group containing a hetero atom, and (meth)acrylates containing an aryl group having 6 to 22 carbon atoms, preferably 6 to 18 carbon atoms and more preferably 6 to 12 carbon atoms which may have a substituent group containing a hetero atom. Specific examples of the aromatic group-containing (meth) acrylate (a-2) include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred are benzyl (meth)acrylate and phenoxyethyl (meth)acrylate. The content of the component (a-2) in the component (a) is preferably from 10 to 100% by weight and more preferably from 20 to 80% by weight. Further, the components (a-1) and (a-2) may also be suitably used in combination with each other.

Meanwhile, the term "(meth)acrylate" used herein means acrylate, methacrylate or both thereof.

The salt-forming group-containing monomer (b) is used for enhancing a dispersion stability of the resultant polymer particles. Examples of the salt-forming group include a carboxyl group, a sulfonic group, a phosphoric group, an amino group and an ammonium group.

The salt-forming group-containing monomer includes cationic monomers and anionic monomers. Examples of the salt-forming group-containing monomer include those described on page 5, from column 7, line 24 to column 8, line 29 of JP 9-286939A.

Typical examples of the cationic monomers include unsaturated amine group-containing monomers and unsaturated ammonium salt group-containing monomers. Among these cationic monomers, preferred are N,N-dimethylaminoethyl (meth)acrylate, N—(N',N'-dimethylaminopropyl) (meth) acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic esters. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The alkyl (meth)acrylate (c) is used for enhancing a dispersion stability of the polymer particles as well as the high lighter-fastness.

Examples of the preferred alkyl (meth)acrylate include those containing a linear or branched alkyl group having 1 to 22 carbon atoms and preferably 6 to 22 carbon atoms. Specific examples of the alkyl (meth)acrylate include methyl (meth)acrylate, ethyl (meth)acrylate, (iso)propyl (meth)acrylate, (iso- or tertiary-)butyl (meth)acrylate, (iso)amyl (meth) acrylate, cyclohexyl (meth)acrylate, 2-ethylhexyl (meth) acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal).

The monomer mixture may further contain (d) a hydroxyl-containing monomer (hereinafter referred to merely as a "component (d)") for enhancing a dispersion stability of the polymer particles.

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: this definition is similarly applied to the subsequent descriptions) (meth)acrylate, polypropylene glycol (n=2 to 30) (meth)acrylate and poly(ethylene glycol (n=1 to 15)/propylene glycol (n=1 to 15)) (meth)acrylate. Among these components (d), preferred are 2-hydroxyethyl (meth)acrylate, polyethylene glycol mono-methacrylate and polypropylene glycol methacrylate.

The monomer mixture may further contain (e) a monomer represented by the following general formula (3) (hereinafter occasionally referred to merely as a "component (e)"):

     (3)

wherein $R^5$ is a hydrogen atom or a lower alkyl group having 1 to 5 carbon atoms; $R^6$ is a divalent hydrocarbon group having 1 to 30 carbon atoms which may contain a hetero atom; $R^7$ is a monovalent hydrocarbon group having 1 to 30 carbon atoms which may contain a hetero atom; and p represents an average molar number of addition, and is a number from 1 to 60 and preferably a number from 1 to 30.

The component (e) exhibits an excellent effect of enhancing an ejection stability of the resultant water-based ink and preventing occurrence of slippage of characters or images printed even upon continuous printing.

Examples of the hetero atom in the general formula (3) include a nitrogen atom, an oxygen atom, a halogen atom and a sulfur atom.

Examples of the suitable $R^5$ group include methyl, ethyl and (iso)propyl.

Examples of the suitable $R^6O$ group include oxyalkylene groups having 2 to 7 carbon atoms such as an oxyethylene group, an oxy(iso)propylene group, an oxytetramethylene group, an oxyheptamethylene group, an oxyhexamethylene group, and combination of at least two of these oxyalkylene groups.

Examples of the suitable $R^7$ group include aliphatic alkyl groups having 1 to 30 carbon atoms and preferably 1 to 20 carbon atoms, aromatic ring-containing alkyl groups having 7 to 30 carbon atoms, and hetero ring-containing alkyl groups having 4 to 30 carbon atoms.

Specific examples of the component (e) include methoxy polyethylene glycol (p in the general formula (3): 1 to 30; this is similarly applied to the subsequent descriptions) (meth) acrylate, methoxy polytetramethylene glycol (p=1 to 30) (meth)acrylate, ethoxy polyethylene glycol (p=1 to 30) (meth)acrylate, (iso)propoxy polyethylene glycol (p=1 to 30) (meth)acrylate, butoxy polyethylene glycol (p=1 to 30) (meth)acrylate, methoxy polypropylene glycol (p=1 to 30) (meth)acrylate, and methoxy (ethylene glycol/propylene glycol copolymer) (p=1 to 30: among which the number of ethylene glycol constitutional units is 1 to 29) (meth)acrylate. Among these compounds, preferred is methoxy polyethylene glycol (p=1 to 30) (meth)acrylate.

These components (a) to (e) are respectively used alone or in the form of a mixture of any two or more thereof.

Upon production of the water-insoluble vinyl polymer, the contents of the above components (a) to (e) in the monomer mixture (contents of non-neutralized components; this definition is similarly applied to the subsequent descriptions) or the contents of constitutional units derived from the components (a) to (e) in the water-insoluble polymer are as follows.

The content of the component (a) is from 25 to 85% by weight, preferably from 30 to 75% by weight and more preferably from 40 to 60% by weight in view of a good high lighter-fastness.

The content of the component (b) is preferably from 0.5 to 10% by weight, more preferably from 1 to 5% by weight and most preferably from 1 to 3% by weight in view of a good dispersion stability of the resultant polymer particles.

The content of the component (c) is preferably from 10 to 78% by weight, more preferably from 10 to 68% by weight, and most preferably from 20 to 60% by weight in view of a good dispersion stability of the resultant polymer particles as well as a good high lighter-fastness.

The total content of the components (a) and (c) [(a)+(c)] in the water-insoluble vinyl polymer is preferably from 30 to 98% by weight and more preferably from 60 to 90% by weight in view of a good high lighter-fastness.

The weight ratio [(a)/(c)] of the component (a) to the components (c) in the water-insoluble vinyl polymer is preferably from 0.4 to 5, more preferably from 0.45 to 4 and still most preferably from 0.5 to 2 in view of a good dispersion stability of the resultant polymer particles as well as a good high lighter-fastness.

Also, the weight ratio ((b)/[(a)+(c)]) of the component (b) to a sum of the components (a) and (c) is preferably from 0.01 to 0.3, more preferably from 0.01 to 0.1, still more preferably from 0.015 to 0.05 and most preferably from 0.016 to 0.03 in view of a good long-term storage stability, a good ejection property of the resultant ink and a good high lighter-fastness.

The content of the component (d) is preferably from 5 to 40% by weight and more preferably from 7 to 20% by weight in view of a good dispersion stability of the polymer particles.

The content of the component (e) is preferably from 5 to 50% by weight and more preferably from 10 to 40% by weight in view of a good ejection property of the resultant ink as well as a good dispersion stability of the polymer particles.

Production of Water-Insoluble Polymer Particles (B)

The water-insoluble polymer particles (B) may be produced by polymerizing an ethylenically unsaturated monomer containing 25 to 85% by weight of an aromatic group-containing monomer in the presence of a reactive surfactant by conventionally known emulsion polymerization methods.

In the emulsion polymerization methods, there may be used any known polymerization initiators. Examples of the polymerization initiators include inorganic peroxides such as hydrogen peroxide, potassium persulfate and ammonium persulfate; organic peroxides such as cumene hydroperoxide, diisopropylbenzene hydroperoxide and p-menthane hydroperoxide; other organic polymerization initiators, e.g., azo-based initiators such as azobisdiisobutyronitrile and methoxybenzene diazomercaptonaphthalene; and redox polymerization initiators using a peroxide or an oxidizing agent in combination with a reducing agent such as sodium hydrogensulfite, sodium thiosulfate, ferrous sulfate and sugar.

The reactive surfactant means a surfactant containing one or more radical-polymerizable unsaturated double bonds in a molecule thereof. The reactive surfactant exhibits an excellent emulsifiability for monomers and, therefore, can produce a water dispersion having an excellent stability, resulting in enhanced high lighter-fastness of the resultant water-based ink.

The reactive surfactant is preferably in the form of an anionic or nonionic surfactant containing at least one hydrophobic group such as linear or branched alkyl or alkenyl groups having 8 to 30 carbon atoms and preferably 12 to 22 carbon atoms, and at least one hydrophilic group such as ionic groups and oxyalkylene groups.

Examples of the alkyl groups include octyl, 2-ethylhexyl, decyl, dodecyl, tetradecyl, hexadecyl, octadecyl and behenyl.

Examples of the alkenyl groups include oleyl and octenyl.

Examples of the ionic groups include cationic groups such as ammonium groups, and anionic groups. Among these ionic groups, preferred are anionic groups, and more preferred are anionic groups such as a carboxyl group, a sulfonic group, a sulfuric group and a phosphoric group and base-neutralized products thereof. Examples of the bases used for neutralizing the anionic groups include lithium hydroxide, sodium hydroxide, potassium hydroxide, ammonia, methylamine, dimethylamine, trimethylamine, ethylamine, diethylamine, triethylamine, triethanolamine and tributylamine.

The oxyalkylene groups preferably contain 1 to 4 carbon atoms, and an average polymerization degree of repeating units thereof is preferably from 1 to 100, more preferably from 4 to 80 and mot preferably from 4 to 50. Among these oxyalkylene groups, preferred are an oxyethylene group and/or an oxypropylene group.

When the surfactant contains two or more kinds of oxyalkylene groups, for example, oxyethylene group and oxypropylene group, these groups may be either block-added, random-added or alternate-added. The terminal end group of the oxyalkylene groups is not particularly limited, and may be a hydroxyl group or an alkoxy group such as methoxy and ethoxy.

When the resultant water-insoluble polymer particles contain a constitutional unit derived from anionic monomers, the reactive surfactants are preferably those surfactant having an anionic group and/or an oxyalkylene group, in view of coagulation stability of the polymer particles. Also, when the resultant water-insoluble polymer particles contain a constitutional unit derived from cationic monomers, the reactive surfactants are preferably those surfactants having a cationic group and/or an oxyalkylene group, in view of coagulation stability of the polymer particles.

Specific examples of the reactive surfactants include sulfosuccinic ester-based surfactants represented by the following general formulae (4) and (5) such as "LATEMUL S-120P" and "LATEMUL S-180A" both available from Kao Corp., and "ELEMINOL JS-2" available from Sanyo Kasei Kogyo Co., Ltd., and alkyl phenol ether-based surfactants represented by the following general formula (6) such as "AQUALON HS-10" and "AQUALON RN-20" both available from Daiichi Kogyo Seiyaku Co., Ltd.

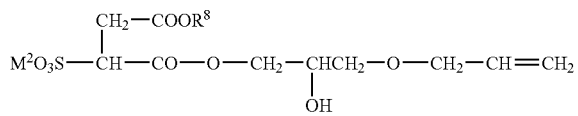

(4)

wherein $M^2$ is Na, K or $NH_4$; and $R^8$ is an alkyl group having 8 to 18 carbon atoms.

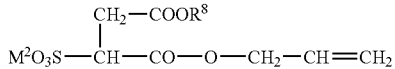

(5)

wherein $M^2$ and $R^8$ have the same meaning as defined in the above formula (4).

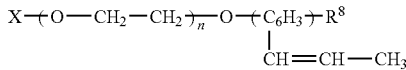

(6)

wherein X is H, $SO_3Na$, $SO_3K$ or $SO_3NH_4$; $R^8$ has the same meaning as defined in the above formula (4); and n is an integer of 1 to 200 and preferably 1 to 50.

Among these reactive surfactants, preferred are those containing anionic groups represented by the above general formulae (4) and (5) in view of facilitated operation of the emulsion polymerization. These reactive surfactants may be used alone or in the form of a mixture of any two or more thereof.

The amount of the reactive surfactant used is usually from 0.1 to 10 parts by weight, preferably from 0.1 to 5 parts by weight and more preferably from 0.1 to 3 parts by weight on the basis of 100 parts by weight of the ethylenically unsaturated monomers other than the reactive surfactant. When the amount of the reactive surfactant used is 0.1 part by weight or more, the polymer particles exhibit a good stability, resulting in an enhanced dispersion stability of the polymer particles, whereas when the amount of the reactive surfactant used is 10 parts by weight or less, the resultant ink have a good high lighter-fastness.

The weight-average molecular weight of the polymer contained in the resultant water-insoluble polymer particles (B) is preferably 300,000 or higher in view of enhancing a dispersion stability of the pigment as well as a water resistance and a high lighter-fastness of the resultant ink.

Meanwhile, the weight-average molecular weight of the polymer may be measured by gel chromatography using dimethylformamide containing 60 mmol/L of phosphoric acid and 50 mmol/L of lithium bromide as a solvent and using polystyrene as a standard substance.

In view of enhancing the film-forming property and the high lighter-fastness, the polymer contained in the resultant water-insoluble polymer particles (B) preferably has a glass transition temperature of 50° C. or lower and more preferably 30° C. or lower. Further, the glass transition temperature of the polymer is preferably –70° C. or higher and more preferably –40° C. or higher in view of enhancing a strength and a high lighter-fastness of the resultant coating film.

In the water dispersion and the water-based ink, the average particle size of the water-insoluble polymer particles (B) is not particularly limited as long as the particles are kept in a stably dispersed state upon storage of the resultant ink. The average particle size of the water-insoluble polymer particles (B) is preferably from 5 to 300 nm and more preferably from 30 to 200 nm as measured at 25° C. using the above laser particle analyzing system "ELS-8000" (cumulant analysis) available from Otsuka Denshi Co., Ltd.

Water Dispersion and Water-Based Ink for Ink-Jet Printing

The water-based ink of the present invention is an ink containing the water dispersion of the present invention and using water as a main medium.

The contents of the pigment (A), the water-insoluble polymer particles (B) and water in the water dispersion and the water-based ink for ink-jet printing are as follows.

The content of the pigment (A) is preferably from 1 to 15% by weight, more preferably from 2 to 10% by weight and most preferably from 2 to 8% by weight in view of a good stability and a good optical density of the water dispersion and the water-based ink.

The content of the water-insoluble polymer particles (B) is preferably from 0.5 to 15% by weight, more preferably from 1 to 12% by weight and most preferably from 2 to 10% by weight in view of a good stability of the water dispersion and the water-based ink.

The weight ratio [the pigment (A)/the water-insoluble polymer particles (B)] of the pigment (A) to the water-insoluble polymer particles (B) is preferably from 20/80 to 90/10 and more preferably from 30/70 to 70/30 in view of a good optical density.

The content of water is preferably from 30 to 90% by weight and more preferably from 40 to 80% by weight.

The water-based ink of the present invention may further contain various additives such as wetting agents, dispersants, defoaming agents, mildew-proof agents and chelating agents, if required. In addition, the pH of the water-based ink of the present invention is preferably from 4 to 10.

The surface tension of the water dispersion of the present invention is preferably from 30 to 65 mN/m and more preferably from 35 to 60 mN/m as measured at 20° C., and the surface tension of the water-based ink of the present invention is preferably from 25 to 50 mN/m and more preferably from 27 to 45 mN/m as measured at 20° C.

The viscosity of the water dispersion having a solid content of 10% by weight is preferably from 2 to 6 mPa·s and more preferably from 2 to 5 mPa·s as measured at 20° C. to produce a water-based ink having a good viscosity. The viscosity of the water-based ink is preferably from 2 to 12 mPa·s and more preferably from 2.5 to 10 mPa·s in order to maintain a good ejection property thereof.

The water-based ink of the present invention is suitably applicable to a piezoelectric type ink-jet printer, though not particularly limited thereto.

EXAMPLES

In the following production examples, examples and comparative examples, the "part(s)" and "%" represent "part(s) by weight" and "% by weight", respectively, unless otherwise specified.

Production Example 1

Production of Water-Insoluble Polymer Particles 1

A glass reactor equipped with a stirrer, a thermometer, a reflux condenser and a nitrogen feed tube was charged with 1000 g of ion-exchanged water, 80 g of an ether sulfate-type reactive surfactant (product name "LATEMUL PD-104" available from Kao Corporation; effective ingredient content: 20%) and 2.4 g of potassium persulfate, and then purged with nitrogen. The reactor was then placed in a water bath to heat the contents of the reactor to 70° C. Next, 800 g of a monomer mixture containing (a) styrene/(b) acrylic acid/(c) 2-ethylhexyl acrylate/(c) butyl acrylate at a mixing weight ratio of 32/2/24/42 was dropped into the reactor over 2 h, and then the contents of the reactor were aged at 80° C. for 2 h, thereby obtaining a water dispersion containing water-insoluble polymer particles 1. As a result, it was confirmed that the thus obtained water-insoluble polymer particles 1 had an average particle size of 120 nm. The solid content (effective content) of the water-insoluble polymer solution was controlled to 45% by adding an appropriate amount of ion-exchanged water thereto.

Production Example 2

Production of Water-Insoluble Polymer Particles 2

The same procedure as defined in Production Example 1 was repeated except for using a monomer mixture containing (a) styrene/(b) acrylic acid/(c) 2-ethylhexyl acrylate at a mixing weight ratio of 49/2/49, thereby obtaining a water dispersion containing water-insoluble polymer particles 2. As a result, it was confirmed that the resultant water-insoluble polymer particles 2 had an average particle size of 125 nm, the water-insoluble polymer solution had a solid content (effective content) of 45%.

Production Example 3

Production of Water-Insoluble Polymer Particles 3

The same procedure as defined in Production Example 1 was repeated except for using a monomer mixture containing (a) styrene/(b) acrylic acid/(c) 2-ethylhexyl acrylate at a mixing weight ratio of 74/2/24, thereby obtaining a water dispersion containing water-insoluble polymer particles 3. As a result, it was confirmed that the resultant water-insoluble polymer particles 3 had an average particle size of 95 nm, the water-insoluble polymer solution had a solid content (effective content) of 45%.

Production Example 4

Production of Water-Insoluble Polymer Particles 4

The same procedure as defined in Production Example 1 was repeated except for using a monomer mixture containing (a) styrene/(b) acrylic acid/(c) 2-ethylhexyl acrylate at a mixing weight ratio of 32/2/66, thereby obtaining a water dispersion containing water-insoluble polymer particles 4. As a result, it was confirmed that the resultant water-insoluble polymer particles 4 had an average particle size of 90 nm, the water-insoluble polymer solution had a solid content (effective content) of 45%.

Comparative Production Example 1

Production of Water-Insoluble Polymer Particles 5

The same procedure as defined in Production Example 1 was repeated except for using a monomer mixture containing (a) styrene/(b) acrylic acid/(c) 2-ethylhexyl acrylate/(c) butyl acrylate at a mixing weight ratio of 49/2/24/25, and using 62 g of polyoxyethylene alkyl ether sodium sulfate as a non-reactive surfactant (product name "LATEMUL E-118B" available from Kao Corporation; effective ingredient content: 26%) in place of the reactive surfactant, thereby obtaining a water dispersion containing water-insoluble polymer particles 5. As a result, it was confirmed that the resultant water-insoluble polymer particles 5 had an average particle size of 115 nm, the water-insoluble polymer solution had a solid content (effective content) of 45%.

Comparative Production Example 2

Production of Water-Insoluble Polymer Particles 6

The same procedure as defined in Production Example 1 was repeated except for using a monomer mixture containing (a) styrene/(b) acrylic acid/(c) 2-ethylhexyl acrylate at a mixing weight ratio of 19/2/79, thereby obtaining a water dispersion containing water-insoluble polymer particles 6. As a result, it was confirmed that the resultant water-insoluble polymer particles 6 had an average particle size of 130 nm, the water-insoluble polymer solution had a solid content (effective content) of 45%.

Comparative Production Example 3

Production of Water-Insoluble Polymer Particles 7

The same procedure as defined in Production Example 1 was repeated except for using a monomer mixture containing (a) styrene/(b) acrylic acid/(c) 2-ethylhexyl acrylate at a mixing weight ratio of 89/2/9, thereby obtaining a water dispersion containing water-insoluble polymer particles 7. As a result, it was confirmed that the resultant water-insoluble polymer particles 7 had an average particle size of 95 nm, the water-insoluble polymer solution had a solid content (effective content) of 45%.

Examples 1 to 9 and Comparative Examples 1 to 6

An aqueous solution of a self-dispersible carbon black (A) [(tradename: "CAB-O-JET 300" available from Cabot Corp.;

solid content: 15%) or (tradename: "BONJET CW-2" available from Orient Kagaku Kogyo Co., Ltd.; solid content: 15%)], the water-insoluble polymer particles (B), 5 parts of glycerol, 5 parts of 2-pyrrolidone, 2 parts of isopropyl alcohol, 1 part of "ACETYLENOL EH" available from Kawaken Fine Chemicals Co., Ltd., and water were prepared and mixed with each other under stirring at 25° C. to obtain a dispersion having an ink composition as shown in Table 1. The thus obtained dispersion was filtered through a 1.2 μm-mesh filter to obtain a water-based ink.

The high lighter-fastness of the thus obtained water-based ink was evaluated by the following method. The results are shown in Table 1.

Meanwhile, the symbols and terms used in Table 1 respectively represent the followings:

CAB: "CAB-O-JET 300" (tradename) available from Cabot Corp.;

CW-2: "BONJET CW-2" (tradename) available from Orient Kagaku Kogyo Co., Ltd.;

ST (%): Content of the constitutional unit derived from the aromatic group-containing macromer;

AA (%): Content of the constitutional unit derived from acrylic acid as a salt-forming group-containing monomer;

EHA (%): Content of the constitutional unit derived from 2-ethylhexyl acrylate as an alkyl (meth)acrylate;

BA (%): Content of the constitutional unit derived from butyl acrylate as an alkyl (meth)acrylate; and "Other Components": 5 parts of glycerol, 5 parts of 2-pyrrolidone, 2 parts of isopropyl alcohol, and 1 part of "ACETYLENOL EH" available from Kawaken Fine Chemicals Co., Ltd.

High Lighter-Fastness

Text printing was carried out on a recycled paper for PPC available from Nippon Kakoseisi Co., Ltd., using an ink-jet printer "Model EM930C" (piezoelectric type) available from Seiko Epson Co., Ltd., and after passage of 1 min and 10 min, the extent of staining of the printed sample when traced with an aqueous fluorescent marker "OPTEX 1" (tradename) commercially available from Zebra Co., Ltd., was observed with naked eyes, and the evaluation was made on the basis of the following evaluation criteria.

[Evaluation Criteria]

⊚: No staining such as rubbed stains was observed when traced with a fluorescent marker.

○: Some rubbed stains were generated when traced with a fluorescent marker, but at a level without practical problems.

Δ: Generation of rubbed stains was observed when traced with a fluorescent marker.

X: Generation of rubbed stains was remarkably observed over a whole surface traced with a fluorescent marker, which is intolerable.

TABLE 1

| | Ink composition | | | | | | |
|---|---|---|---|---|---|---|---|
| | (A) Pigment | | (B) Water-insoluble polymer particles | | | | | |
| | Kind | Part (%) | Kind | ST (%) | AA (%) | EHA (%) | BA (%) | Part (%) |
| Example 1 | CAB | 40(6) | Particles 1 | 32 | 2 | 24 | 42 | 6.7(3) |
| Comparative Example 1 | CAB | 40(6) | Particles 5 | 49 | 2 | 24 | 25 | 6.7(3) |
| Example 2 | CAB | 40(6) | Particles 2 | 49 | 2 | 49 | — | 22.2(10) |
| Example 3 | CAB | 40(6) | Particles 2 | 49 | 2 | 49 | — | 13.4(6) |
| Example 4 | CAB | 40(6) | Particles 2 | 49 | 2 | 49 | — | 6.7(3) |
| Example 5 | CAB | 40(6) | Particles 2 | 49 | 2 | 49 | — | 2.2(1) |
| Example 6 | CAB | 40(6) | Particles 2 | 49 | 2 | 49 | — | 1.1(0.5) |
| Comparative Example 1 | CAB | 40(6) | — | — | — | — | — | — |
| Comparative Example 2 | CAB | 40(6) | Particles 6 | 19 | 2 | 79 | — | 6.7(3) |
| Comparative Example 3 | CAB | 40(6) | Particles 7 | 89 | 2 | 9 | — | 6.7(3) |
| Example 7 | CW-2 | 40(6) | Particles 3 | 74 | 2 | 24 | — | 6.7(3) |
| Example 8 | CW-2 | 40(6) | Particles 4 | 32 | 2 | 66 | — | 6.7(3) |
| Comparative Example 4 | CW-2 | 40(6) | — | — | — | — | — | — |
| Comparative Example 5 | CW-2 | 40(6) | Particles 6 | 19 | 2 | 79 | — | 6.7(3) |
| Comparative Example 6 | CW-2 | 40(6) | Particles 7 | 89 | 2 | 9 | — | 6.7(3) |

| | Ink composition | | Evaluation | |
|---|---|---|---|---|
| | Water | Other components | High lighter-fastness | |
| | Part | Part | 1 min | 10 min |
| Example 1 | 40.3 | 13 | ○ | ⊚ |
| Comparative Example 1 | 40.3 | 13 | X | Δ |
| Example 2 | 24.8 | 13 | ⊚ | ⊚ |
| Example 3 | 33.7 | 13 | ⊚ | ⊚ |
| Example 4 | 40.3 | 13 | ⊚ | ⊚ |
| Example 5 | 44.8 | 13 | ○ | ⊚ |
| Example 6 | 45.9 | 13 | Δ | ○ |

TABLE 1-continued

| | | | | |
|---|---|---|---|---|
| Comparative Example 1 | 47 | 13 | X | X |
| Comparative Example 2 | 40.3 | 13 | X | Δ |
| Comparative Example 3 | 40.3 | 13 | X | X |
| Example 7 | 40.3 | 13 | ○ | ◉ |
| Example 8 | 40.3 | 13 | ○ | ◉ |
| Comparative Example 4 | 47 | 13 | X | X |
| Comparative Example 5 | 40.3 | 13 | X | Δ |
| Comparative Example 6 | 40.3 | 13 | X | X |

Note:
Numerals in parentheses appearing in the columns for the components (A) and (B) represent contents of effective ingredients in the self-dispersible carbon black and the polymer particles, respectively.

From the results shown in Table 1, it was confirmed that the water-based inks for ink-jet printing obtained in the above Examples were excellent in high lighter-fastness, and exhibited a sufficient optical density even upon printing on an ordinary paper.

INDUSTRIAL APPLICABILITY

The water-based ink containing the water dispersion for ink-jet printing according to the present invention, not only satisfies a high optical density but also exhibits an excellent high lighter-fastness.

The invention claimed is:

1. A water-base ink for ink-jet printing, comprising:
a water dispersion comprising (A) a pigment and (B) water-insoluble polymer particles produced by polymerizing ethylenically unsaturated monomers containing 30 to 75% by weight of an aromatic group-containing monomer in the presence of a reactive sulfonated surfactant,
where the (A) pigment is a self-dispersible carbon black,
the reactive sulfonated surfactant is a sulfosuccinic ester-containing surfactant, and
the glass transition temperature of the polymer of the (B) water-insoluble polymer particles is −40° C. or higher and 30° C. or lower.

2. The water-base ink for ink-jet printing according to claim 1, wherein the ethylenically unsaturated monomer further contains an alkyl (meth)acrylate.

3. The water-base ink for ink jet printing according to claim 2, wherein the water-insoluble polymer particles (B) are polymer particles containing 30 to 75% by weight of a constitutional unit derived from the aromatic group-containing monomer (a) and 10 to 68% by weight of a constitutional unit derived from the alkyl (meth)acrylate (c).

4. The water-base ink for ink jet printing according to claim 3, wherein the weight ratio [(a)/(c)] of the constitutional unit derived from the aromatic group-containing monomer (a) to the constitutional unit derived from the alkyl (meth)acrylate (c) is from 0.4 to 5.

5. The water-base ink for ink-jet printing according to claim 1, wherein a weight ratio [the pigment (A)/the water-insoluble polymer particles (B)] of the pigment (A) to the water-insoluble polymer particles (B) is 20/80 to 90/10.

6. A method, comprising:
forming an image by ink jet printing the water-base ink as defined in claim 1 on a recording medium.

7. The water-base ink for ink jet printing according to claim 1, wherein the reactive sulfonated surfactant is at least one selected from the group consisting of compounds represented by the following formulae (4) and (5):

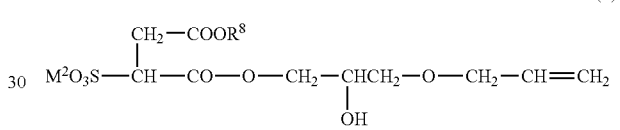

wherein $M^2$ is Na, K or $NH_4$; and $R^8$ is an alkyl group having 8 to 18 carbon atoms; and

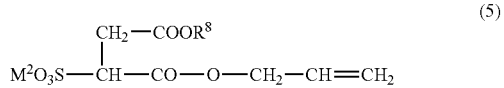

wherein $M^2$ is Na, K or $NH_4$ and $R^8$ is an alkyl group having 8 to 18 carbon atoms.

8. The water-base ink for ink jet printing according to claim 1, wherein the reactive surfactant is present in an amount of from 0.1 to 3 parts by weight in the water-insoluble polymer particles (B), wherein parts by weight is calculated on the total parts of ethylenically unsaturated monomers.

9. The water-base ink for ink-jet printing according to claim 1, wherein the water-insoluble polymer particles comprise a polymer containing reacted units of styrene, acrylic acid and 2-ethylhexylacrylate.

10. The water-base ink for ink-jet printing according to claim 9, wherein the water-insoluble polymer particles comprise a polymer consisting essentially of reacted units of styrene, acrylic acid and 2-ethylhexylacrylate.

11. The water-base ink for ink jet printing according to claim 1, wherein the ethylenically unsaturated monomer further contains 10 to 68% by weight of 2-ethylhexyl (meth)acrylate.

12. The water-base ink for ink jet printing according to claim 1, wherein the reactive sulfonated surfactant comprises at least one hydrophobic alkyl group selected from the group consisting of octyl, 2-ethylhexyl, decyl, dodecyl, tetradecyl, hexadecyl, octadecyl and behenyl.

13. The water-base ink for ink jet printing according to claim 1, wherein the reactive sulfonated surfactant comprises at least one alkenyl group selected from the group consisting of oleyl and octenyl.

14. The water-base ink for ink jet printing according to claim 1, wherein an image obtained by text printing the water dispersion and drying for 1-10 minutes does not stain when traced with a fluorescent marker.

15. A water-base ink for ink jet printing, comprising:
a water dispersion comprising (A) a pigment and (B) water-insoluble polymer particles in a weight ratio [the pigment (A)/the water-insoluble polymer particles (B)] of the pigment (A) to the water-insoluble polymer particles (B) is 20/80 to 90/10,
wherein the water-insoluble polymer particles are produced by polymerizing ethylenically unsaturated monomers containing 30 to 75% by weight of styrene (a) and 10 to 68% by weight of 2-ethylhexyl (meth)acrylate monomer (c), and acrylic acid (e) in the presence of a reactive sulfonated surfactant,
wherein the weight ratio [(a)/(c)] of the constitutional unit derived from the aromatic group-containing monomer (a) to the constitutional unit derived from the 2-ethylhexyl (meth)acrylate (c) is from 0.4 to 5
where the (A) pigment is a self-dispersible carbon black,
the reactive sulfonated surfactant is at least one sulfosuccinic ester-containing surfactant selected from the group consisting of a compound represented by the following formulae (4) and (5):

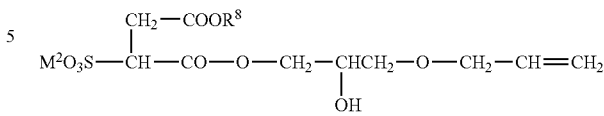

(4)

wherein $M^2$ is Na, K or $NH_4$; and $R^8$ is an alkyl group having 8 to 18 carbon atoms; and

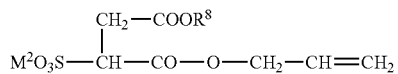

(5)

wherein $M^2$ is Na, K or $NH_4$ and $R^8$ is an alkyl group having 8 to 18 carbon atoms;
wherein the reactive surfactant is present in an amount of from 0.1 to 3 parts by weight in the water-insoluble polymer particles (B), wherein parts by weight is calculated on the total parts of ethylenically unsaturated monomers; and
wherein the glass transition temperature of the polymer of the (B) water-insoluble polymer particles is −40° C. or higher and 30° C. or lower.

16. A method, comprising:
depositing the water-base ink defined in claim 1 onto a recording medium to form an image,
wherein the depositing forms the image without heating the recording medium.

* * * * *